(12) United States Patent
Hayashi et al.

(10) Patent No.: US 11,462,057 B2
(45) Date of Patent: Oct. 4, 2022

(54) INFORMATION PROCESSING APPARATUS, INFORMATION PROCESSING SYSTEM, AND INFORMATION PROCESSING METHOD

(71) Applicant: TOYOTA JIDOSHA KABUSHIKI KAISHA, Toyota (JP)

(72) Inventors: Masatoshi Hayashi, Nisshin (JP); Shugen Yamamura, Nagoya (JP); Kosuke Yoshida, Nagakute (JP); Hiroto Inoue, Nagakute (JP); Yoshino Yamamori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 16/584,985

(22) Filed: Sep. 27, 2019

(65) Prior Publication Data

US 2020/0105071 A1    Apr. 2, 2020

(30) Foreign Application Priority Data

Oct. 2, 2018   (JP) .............................. JP2018-187581

(51) Int. Cl.
*G07B 15/06* (2011.01)
*G06Q 30/02* (2012.01)
(Continued)

(52) U.S. Cl.
CPC ....... *G07B 15/063* (2013.01); *G06Q 30/0271* (2013.01); *G08G 1/017* (2013.01); *G08G 1/0116* (2013.01); *G08G 1/096783* (2013.01)

(58) Field of Classification Search
CPC ............. G07B 15/063; G06Q 30/0271; G08G 1/0116; G08G 1/017; G08G 1/096783
See application file for complete search history.

(56) References Cited

U.S. PATENT DOCUMENTS

| 6,545,596 B1 * | 4/2003 | Moon | G08G 1/20 |
| | | | 340/425.5 |
| 6,587,755 B1 * | 7/2003 | Smith | G06Q 30/0269 |
| | | | 701/1 |

(Continued)

FOREIGN PATENT DOCUMENTS

| CN | 102118540 A | 7/2011 |
| CN | 204423467 U | 6/2015 |
| JP | 2004-334754 A | 11/2004 |

*Primary Examiner* — Mohamed Barakat
*Assistant Examiner* — Rufus C Point
(74) *Attorney, Agent, or Firm* — Oliff PLC

(57) ABSTRACT

Provided is an information processing system including: a roadside apparatus placed at an entrance or an exit of a toll road or a pay facility; a display apparatus placed at the entrance or the exit; and a server capable of communicating with the roadside apparatus. The roadside apparatus includes: a radio communicator performing predetermined radio communications with an onboard apparatus loaded on the vehicle passing through the entrance or the exit; a communicator communicating with the server; and a processor transmitting user information regarding a user owning the vehicle received from the onboard apparatus via the radio communicator to the server via the communicator. The server includes a processor that: receives user information; when the user information is the user information regarding an advertiser, acquires advertisement information corresponding to the advertiser; and transmits an instruction to display the advertisement information on the display apparatus.

4 Claims, 6 Drawing Sheets

(51) Int. Cl.
*G08G 1/0967* (2006.01)
*G08G 1/01* (2006.01)
*G08G 1/017* (2006.01)

(56) References Cited

U.S. PATENT DOCUMENTS

| | | | | |
|---|---|---|---|---|
| 7,495,631 B2* | 2/2009 | Bhakta | | G06Q 30/0272 |
| | | | | 345/1.1 |
| 7,642,897 B2* | 1/2010 | Karabinis | | G01D 21/00 |
| | | | | 340/5.2 |
| 7,890,126 B2* | 2/2011 | Benco | | H04L 63/08 |
| | | | | 382/104 |
| 11,170,644 B2* | 11/2021 | Somanath | | H04W 4/90 |
| 2004/0155797 A1* | 8/2004 | Arai | | G07B 15/063 |
| | | | | 705/13 |
| 2007/0055562 A1* | 3/2007 | Kralik | | G06Q 30/02 |
| | | | | 705/14.12 |
| 2007/0214041 A1* | 9/2007 | Patel | | G06Q 30/0257 |
| | | | | 705/14.58 |
| 2008/0089288 A1* | 4/2008 | Anschutz | | H04W 4/02 |
| | | | | 370/331 |
| 2008/0162154 A1* | 7/2008 | Fein | | G06Q 30/02 |
| | | | | 705/14.4 |
| 2010/0121703 A1* | 5/2010 | Goto | | G06Q 30/02 |
| | | | | 705/14.41 |
| 2010/0321206 A1* | 12/2010 | Kuga | | H04L 69/40 |
| | | | | 340/905 |
| 2010/0331015 A1* | 12/2010 | Cherifi | | G06F 16/9537 |
| | | | | 707/769 |
| 2011/0035098 A1* | 2/2011 | Goto | | G09B 29/007 |
| | | | | 701/36 |
| 2011/0082753 A1* | 4/2011 | Ohman | | G06Q 30/0272 |
| | | | | 705/14.69 |
| 2012/0113254 A1* | 5/2012 | Cruz | | G09F 27/00 |
| | | | | 40/624 |
| 2013/0013413 A1* | 1/2013 | McDaniel | | G06Q 30/0266 |
| | | | | 705/500 |
| 2013/0216102 A1* | 8/2013 | Ryan | | G06Q 30/0281 |
| | | | | 382/105 |
| 2013/0304574 A1* | 11/2013 | Thomas | | G06Q 30/02 |
| | | | | 705/14.66 |
| 2014/0149190 A1* | 5/2014 | Robinson | | G07B 15/063 |
| | | | | 705/13 |
| 2014/0344062 A1* | 11/2014 | Lamont | | G06Q 30/0267 |
| | | | | 705/14.64 |
| 2014/0344063 A1* | 11/2014 | Vallat | | H04W 12/069 |
| | | | | 705/14.64 |
| 2017/0199979 A1* | 7/2017 | Reiner | | G16H 10/60 |
| 2017/0371608 A1* | 12/2017 | Wasserman | | G07C 5/008 |
| 2018/0114251 A1* | 4/2018 | Zavesky | | G06V 20/54 |
| 2018/0190040 A1* | 7/2018 | Batten | | G06Q 20/405 |
| 2019/0043088 A1* | 2/2019 | Garcia | | G06Q 30/0226 |
| 2019/0050904 A1* | 2/2019 | Wasserman | | G08G 1/0116 |
| 2019/0222885 A1* | 7/2019 | Cho | | G06Q 30/0265 |
| 2020/0126124 A1* | 4/2020 | Inoue | | G06Q 30/0266 |

* cited by examiner

INFORMATION PROCESSING APPARATUS, INFORMATION PROCESSING SYSTEM, AND INFORMATION PROCESSING METHOD

CROSS REFERENCE TO RELATED APPLICATION

This application claims the benefit of Japanese Patent Application No. 2018-187581, filed on Oct. 2, 2018, which is hereby incorporated by reference herein in its entirety.

BACKGROUND

Technical Field

The present disclosure relates to an information processing apparatus, an information processing system, and an information processing method.

Description of the Related Art

There is disclosed an information distribution system that distributes information such as advertisements to user terminals loaded on vehicles running on expressways, and discounts tolls of the expressways when the vehicles reach exit gates of the expressways (for example, Patent document 1).

CITATION LIST

Patent Document

Patent document 1: Japanese Patent Laid-Open No. 2004-334754

However, with the conventional technique, distribution destinations of advertisement information are user terminals loaded on vehicles running on expressways. Therefore, those who see the advertisement are limited to passengers inside the vehicles, so that the advertising effect is smaller.

An aspect of the disclosure is to provide an information processing apparatus, an information processing system, and an information processing method capable of improving the advertising effect for passengers of vehicles passing through entrances or exits of toll roads or pay facilities.

SUMMARY

An aspect of the present disclosure is an information processing apparatus including a processor configured to:

acquire user information regarding a user who owns a vehicle passing through an entrance or an exit of a toll road or a pay facility;

acquire, when the user information is user information regarding an advertiser, advertisement information corresponding to the advertiser; and give an instruction to display the advertisement information on a display apparatus placed at the entrance or the exit.

Another aspect of the present disclosure is an information processing system including a roadside apparatus placed at an entrance or an exit of a toll road or a pay facility, a display apparats placed at the entrance or the exit, and a server capable of communicating with the roadside apparatus, wherein:

the roadside apparatus includes a radio communicator configured to perform predetermined radio communications with an onboard apparatus loaded on a vehicle passing through the entrance or the gate, a communicator configured to communicate with the server, and a processor configured to transmit user information regarding a user who owns the vehicle, received from the onboard apparatus via the radio communicator to the server via the communicator; and the server includes a processor configured to receive the user information, acquire, when the user information is user information regarding an advertiser, advertisement information corresponding to the advertiser, and transmit an instruction to display the advertisement information on the display apparatus.

Still another aspect of the present disclosure is an information processing method including:

acquiring user information regarding a user who owns a vehicle passing through an entrance or an exit of a toll road or a pay facility;

acquiring, when the user information is user information regarding an advertiser, advertisement information corresponding to the advertiser; and giving an instruction to display the advertisement information on a display apparatus placed at the entrance or the exit.

Yet another aspect of the present disclosure is an information processing method including:

by a roadside apparatus placed at an entrance or an exit of a toll road or a pay facility, receiving user information regarding a user who owns a vehicle, from an onboard apparatus loaded on the vehicle passing through the entrance or the exit via a radio communicator, and transmitting the user information to a server; and by the server, receiving the user information, acquiring, when the user information is user information regarding an advertiser, advertisement information corresponding to the advertiser, and transmitting an instruction to display the advertisement information on a display apparatus placed at the entrance or the exit.

With the present disclosure, it is possible to improve the advertising effect for passengers of vehicles passing through entrances or exits of toll roads or pay facilities.

DESCRIPTION OF THE EMBODIMENTS

Figure 1:
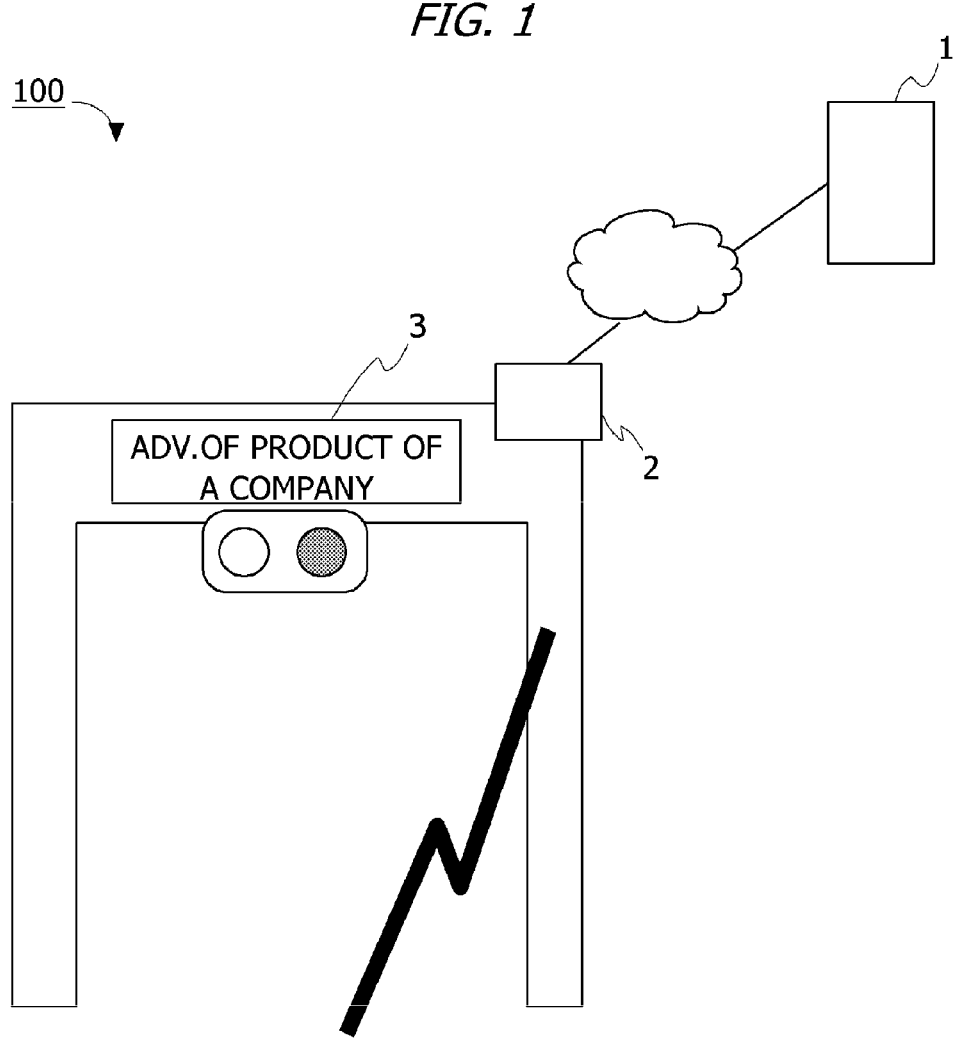
FIG. 1 is a diagram illustrating a system configuration of an advertisement posting system according to a first embodiment.

An aspect of the present disclosure is an information processing apparatus including a processor may be configured to: acquire user information regarding a user who owns a vehicle passing through an entrance or an exit of a toll road or a pay facility; acquire, when the user information is user information regarding an advertiser, advertisement information corresponding to the advertiser; and give an instruction to display the advertisement information on a display apparatus placed at the entrance or the exit.

Examples of toll roads may be expressways, bridges, tunnels, and sightseeing roads. Examples of pay facilities may be pay parking lots and drive-through shops capable of allowing vehicles to enter. For example, a gate may be placed at the entrance or the exit of the toll road or the pay facility or may be omitted. The user information may be acquired by receiving the information transmitted from an onboard apparatus loaded on a vehicle or by receiving the user information from another apparatus that has received the information from the onboard apparatus, for example. The advertisement information may be acquired by reading out the information stored in advance in a memory or by receiving the information from another apparatus that has acquired the information, for example. An instruction for displaying information on the display apparatus may be given directly to the display apparatus or indirectly via an apparatus that controls display on the display apparatus.

With the aspect of the present disclosure, when a vehicle owned by an advertiser passes through the entrance or the exit of the toll road or the pay facility, the advertisement information corresponding to the advertiser is displayed on the display apparatus placed at the entrance or the exit. Thereby, the advertisement information can be indicated to passengers of following vehicles passing through the entrance or the exit after the vehicle owned by the advertiser passes therethrough, so that the advertising effect can be improved.

Further, for example, when an existing display apparatus for presenting information to the passengers of the passing vehicles placed at the entrance or the exit, such as the display apparatus placed in the vicinity of the gate of an expressway, is used as the display apparatus for displaying the advertisement information, existing equipment can be utilized effectively.

Further, in the aspect of the present disclosure, the information processing apparatus may be a roadside apparatus placed at the entrance or the exit. In such a case, the roadside apparatus may further include a radio communicator that performs predetermined radio communications with the onboard apparatus loaded on the vehicle passing through the entrance or the exit. Further, the processor may receive entrance information regarding admittance to the toll road or the pay facility and payment information regarding payment of a fee along with the user information from the onboard apparatus via the radio communicator. Further, the processor may acquire information of a use fee of the toll road or the pay facility based on the entrance information, and transmit the information of the use fee of the toll road or the pay facility to a first server settling a payment based on the payment information. Further, the processor may acquire information of the advertising fee related to displaying on the display apparatus the advertisement information acquired based on the user information and settled by a second server. Further, the processor may transmit the information of the use fee of the toll road or the pay facility and the information of the advertising fee of the advertisement information to the onboard apparatus. The first server and the second server are servers of credit card companies used for making a payment of the fee, for example. The first server and the second server may be the same server or may be different servers, and administrators thereof may be the same or may be different.

Further, in the aspect of the present disclosure, the information processing apparatus may be a server capable of communicating with the roadside apparatus placed at the entrance or the exit. The processor may further receive the user information from the onboard apparatus loaded on the vehicle passing through the entrance or the exit via the roadside apparatus, acquire the information of the advertising fee related to displaying the acquired advertisement information on the display apparatus, transmit the information of the advertising fee of the advertisement information to the onboard apparatus via the roadside apparatus, and transmit the information of the advertising fee of the advertisement information to a predetermined server settling the payment.

Radio communications between the roadside apparatus and the onboard apparatus may be done according to the so-called near field communication system such as DSRC, BLUETOOTH (registered trademark), or WiFi Direct. Note, however, that the communication system is not limited to those. The entrance information includes information that may be parameters for calculating the use fee of the toll road or the pay facility, such as identification information of the entrance and time of admission, for example.

With the aspect of the present disclosure, the advertiser can pay the advertising fee related to displaying the advertisement information on the display apparatus placed at the entrance or the exit together with the use fee of the toll road or the pay facility by passing through the entrance or the exit. This makes it possible to lighten the trouble for the advertiser to make a payment of the advertising fee.

In the following, an embodiment of the present disclosure will be described with reference to the drawings. The configuration of the embodiment described below is an example, and the present disclosure is not limited to the configuration of the embodiment.

First Embodiment

FIG. 1 is a diagram illustrating a system configuration of an advertisement posting system 100 according to a first embodiment. The advertisement posting system 100 is a system which, when a vehicle owned by an advertiser passes through an entrance or an exit of a toll road or a pay facility, posts advertisement information of the advertiser on a display apparatus placed in the vicinity of the entrance or the exit, for example. The first embodiment will be described by referring to a case where the advertisement information of the advertiser is posted on a roadside display apparatus placed in the vicinity of an exit gate of an expressway when the vehicle owned by the advertiser passes through the exit gate of the expressway. The exit gate of the expressway is an example of the "exit."

The advertisement posting system 100 includes a center server 1, a roadside apparatus 2 placed in the vicinity of the exit gate of the expressway, and a roadside display apparatus 3 placed in the vicinity of the exit gate. In FIG. 1, an onboard apparatus 4 loaded on the vehicle passing through the exit gate is also illustrated for description. Further, a single roadside apparatus 2 and a single roadside display apparatus 3 are extracted to be illustrated in FIG. 1 for simplifying the description. Each of the roadside apparatus 2 and the roadside display apparatus 3 is placed by being associated with a single exit gate of the expressway, for example. The roadside display apparatus 3 is an example of "display apparatus placed at the entrance or the exit."

While the roadside apparatus 2 and the roadside display apparatus 3 are placed at an upper side of the exit gate in FIG. 1, setting places of those apparatuses are not limited to the positions illustrated in FIG. 1. For example, the roadside display apparatus 3 may be placed at a position away from the exit gate by a predetermined distance (about 3 to 10 m).

The roadside apparatus 2, the roadside display apparatus 3, and the onboard apparatus 4 are apparatuses included also in an ETC (Electronic Toll Collection System) system of expressways, for example. The roadside display apparatus 3 is a display apparatus displaying a sign indicating that the gate is for the vehicle with an onboard ETC apparatus loaded thereon, for example. The onboard apparatus 4 is an onboard ETC apparatus, for example. The roadside apparatus 2 and the onboard apparatus 4 perform radio communications by a near field communication system such as DSRC (Dedicated Short Range Communications). The roadside apparatus 2 transmits, at a predetermined period, signals including identification information of the gate with which the roadside apparatus 2 is associated (placed).

Each of the roadside apparatus 2 and the center server 1 is connected to a network such as the Internet, for example, and is communicable via the network. Further, the roadside apparatus 2 is connected to the roadside display apparatus 3 placed at the exit gate with which the roadside apparatus 2 is associated, for example, and capable of controlling display on the roadside display apparatus 3.

In the ETC system, various kinds of the following processing are executed, for example. The onboard apparatus 4, for example, receives a signal transmitted from the roadside apparatus placed in the vicinity of an entrance gate when the vehicle passes through the entrance gate of the expressway, and records admission to the expressway based on the reception of the signal. Specifically, the onboard apparatus 4 generates and saves entrance information including the identification information of the entrance gate included in the signal transmitted from the roadside apparatus and reception time of the signal as the passing time of the entrance gate.

The onboard apparatus 4 detects passage of the exit gate and the roadside apparatus 2 by receiving the signal transmitted from the roadside apparatus 2 placed in the vicinity of the exit gate when the vehicle passes through the exit gate of the expressway. The onboard apparatus 4 transmits the entrance information, the ETC card number, and vehicle information to the roadside apparatus 2, for example. The vehicle information includes information of a vehicle model, for example. Upon receiving such information from the onboard apparatus 4, the roadside apparatus 2 acquires the toll based on the entrance information and the vehicle information, and transmits the information of the toll to a predetermined settlement server and the onboard apparatus 4. Thereby, the ETC system collects the toll of the expressway. The settlement server is a server of a credit card company used for making a payment of the toll for ETC, for example. The toll of the expressway is an example of the "use fee" of the "toll road."

In the first embodiment, upon detecting the roadside apparatus 2 placed in the vicinity of the exit gate, the onboard apparatus 4 also transmits user identification information of the owner of the vehicle to the roadside apparatus 2, in addition to the entrance information, the ETC card number, and the vehicle information. The roadside apparatus 2 transmits the vehicle information to the center server 1 when the received user identification information is the user identification information of a user registered as an advertiser of the advertisement posting system 100. The user identification information is an example of the "user information." Note that the "user information" may include any information other than the user identification information, as long as it is the information regarding the user.

The center server 1 holds a database that sores therein the advertisement information for each of the advertisers of the advertisement posting system 100, for example. Upon receiving the user identification information from the roadside apparatus 2, the center server 1 acquires the advertisement information corresponding to the user identification information from the database. Further, the center server 1 acquires information of the advertising fee related to posting the advertisement information. The center server 1 transmits the advertisement information and the information of the advertising fee to the roadside apparatus 2.

Upon receiving the advertisement information and the information of the advertising fee from the center server 1, the roadside apparatus 2 outputs the advertisement information to the roadside display apparatus 3 to display the advertisement information on the roadside display apparatus 3. Further, the roadside apparatus 2 transmits the information of the advertising fee to the onboard apparatus 4 along with the toll of the expressway.

That is, with the first embodiment, when the vehicle of the advertiser passes through the exit gate of the expressway, the advertisement of the advertiser is displayed on the display apparatus placed in the vicinity of the exit gate and the advertisement information can be posted for the following vehicles of the vehicle of the advertiser. Further, since the ETC system is used, the advertising fee can be collected together with the toll of the expressway.

Figure 2:
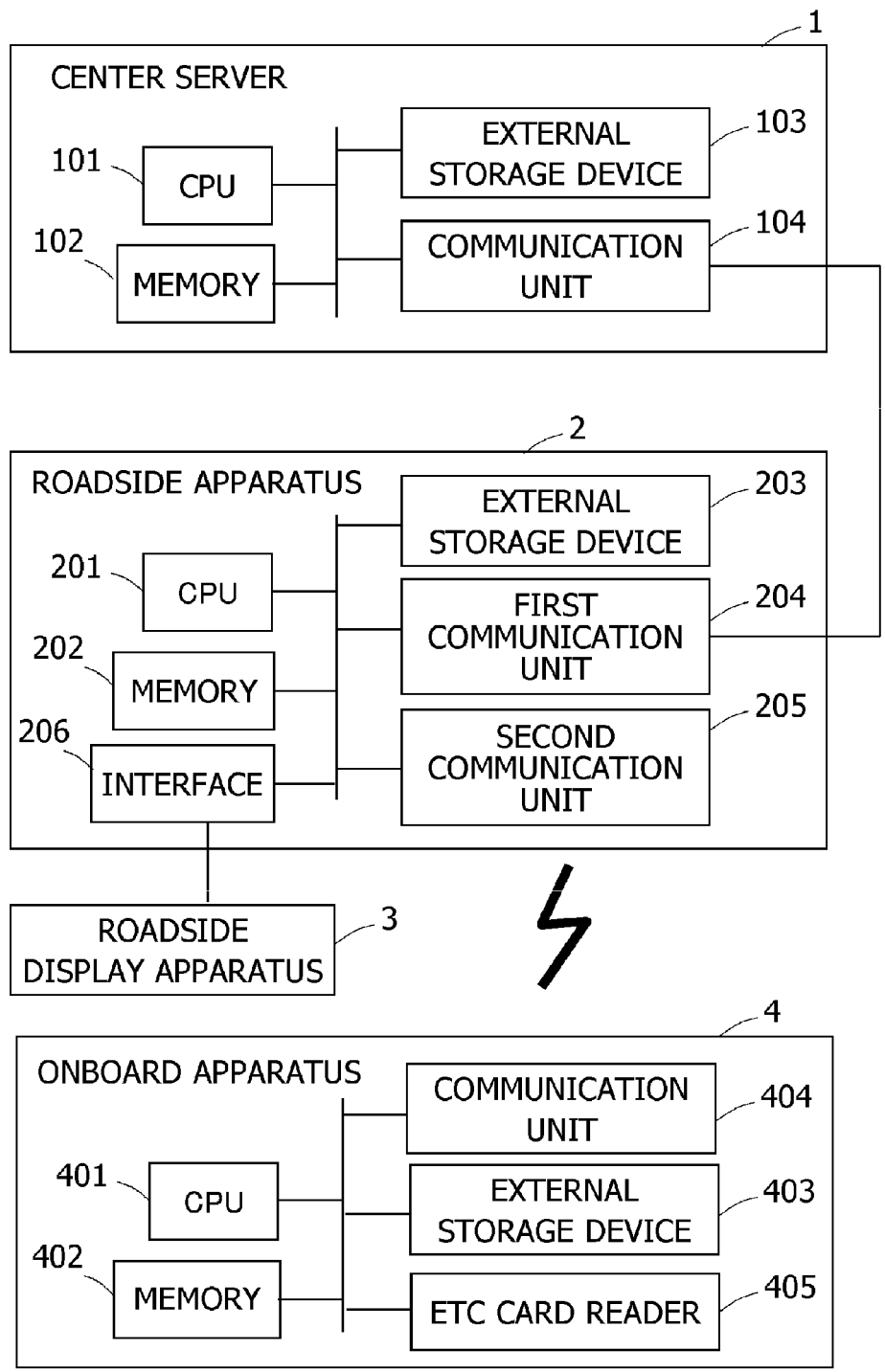
FIG. 2 is a diagram illustrating examples of hardware components of the center server, the roadside apparatus, and the onboard apparatus in the advertisement posting system.

FIG. 2 is a diagram illustrating examples of hardware components of the center server 1, the roadside apparatus 2, and the onboard apparatus 4 in the advertisement posting system 100. The center server 1 is a dedicated computer or a general-purpose computer, for example. The center server 1 includes a CPU (Central Processing Unit) 101, a memory 102, an external storage device 103, and a communication unit 104 as the hardware components. The memory 102 and the external storage device 103 are recording mediums capable of being read by computers. The center server 1 is an example of the "information processing apparatus."

The external storage device 103 stores therein various programs and data used by the CPU 101 when executing each of those programs. The external storage device 103 is an EPROM (Erasable Programmable ROM) or a hard disk drive, for example. The programs held in the external storage device 103 are an operating system (OS), a control program of the advertisement posting system 100, and other various application programs, for example. The control program of the advertisement posting system 100 is a program for displaying the advertisement of the advertiser on the roadside display apparatus 3 placed in the vicinity of the exit gate when the vehicle of the advertiser passes through the exit gate of the expressway.

The memory 102 is a main memory that is used to provide a work area and a memory area for loading the programs stored in the external storage device 103 to the CPU 101, and used as a buffer, for example. For example, the memory 102 includes a semiconductor memory such as a ROM (Read Only Memory) and a RAM (Random Access Memory).

The CPU 101 executes various kinds of processing by loading the OS and application programs held in the external storage device 103 on the memory 102 and executing those programs. The number of the CPU 101 is not limited to one but a plurality of CPUs 101 may be provided. The CPU 101 is an example of the "control unit."

The communication unit 104 is an interface that inputs and outputs information to/from the network. The communication unit 104 may be an interface connecting with a wired network or may be an interface connecting with a wireless network. The communication unit 104 is a NIC (Network Interface Card) or a radio circuit, for example.

Next, as the hardware components, the roadside apparatus 2 includes a CPU 201, a memory 202, an external storage device 203, a first communication unit 204, a second communication unit 205, and an interface 206. The CPU 201, the memory 202, and the external storage device 203 are the same as the CPU 101, the memory 102, and the external storage device 103. In the external storage device 203 of the roadside apparatus 2, a control program of the advertisement posting system 100 for the roadside apparatus 2 is stored. The control program of the advertisement posting system 100 for the roadside apparatus 2 stored in the external storage device 203 of the roadside apparatus 2 is a program for detecting that the vehicle of the advertiser has passed the exit gate that is associated with the roadside apparatus 2, acquiring the advertisement information of the advertiser from the center server 1, and displaying the advertisement information on the roadside display apparatus 3. The roadside apparatus 2 is an example of the "information processing apparatus."

The first communication unit 204 is an interface that inputs and outputs the information to/from the network, and is communicable with the center server 1 via the network. The first communication unit 204 may be an interface connecting with a wired network or may be an interface connecting with a wireless network. The first communication unit 204 is a NIC (Network Interface Card) or a radio circuit, for example. The first communication unit 204 is an example of the "communicator" of the "roadside apparatus."

The second communication unit 205 performs communications according to a predetermined near field communication system. For example, the second communication unit 205 performs communications according to DSRC. The second communication unit 205 transmits the signal including the identification information of the exit gate at a predetermined period, for example. Upon receiving a connection request or the like from a reception apparatus that has received the signal, the second communication unit 205 establishes a session and performs communications with the reception apparatus. The reception apparatus receiving the signal transmitted from the second communication unit 205, in the first embodiment, is the onboard apparatus 4. The interface 206 is an interface connecting a cable that connects the roadside display apparatus 3 and the roadside apparatus 2. The second communication unit 205 is an example of the "radio communicator" of the "roadside apparatus."

Next, as the hardware components, the onboard apparatus 4 includes a CPU 401, a memory 402, an external storage device 403, a communication unit 404, and an ETC card reader 405, for example. The CPU 401, the memory 402, and the external storage device 403 are the same as the CPU 101, the memory 102, and the external storage device 103. Note, however, that a control program for the onboard apparatus of the advertisement posting system 100, for example, is stored in the external storage device 403 of the onboard apparatus 4. The control program for the onboard apparatus of the advertisement posting system 100 is a program for having the roadside display apparatus 3 display the advertisement information when passing through the exit gate, for example. However, the program is not limited to that, and it is also possible to store a control program for the onboard apparatus of the ETC system instead of the control program for the onboard apparatus of the advertisement posting system 100 depending on an embodiment of the advertisement posting system 100. An example of such case may be a case where the user identification information is not the information peculiar to the advertisement posting system 100 but any information used in the ETC system.

The communication unit 404 performs communications according to a predetermined near field communication system same as that of the roadside apparatus 2. For example, the communication unit 404 performs communications according to DSRC. The communication unit 404 performs reception processing of signals at a predetermined period and, upon receiving the signal transmitted from the roadside apparatus 2, for example, notifies the CPU 401 of reception of the signal. Thereafter, the communication unit 404 establishes a session with the roadside apparatus 2 according to an instruction from the CPU 401, for example, and performs transmission and reception of data with the roadside apparatus 2 according to the predetermined near field communications system.

The ETC card reader 405 includes an insertion port of the ETC card, and reads out the information recorded on the ETC card inserted into the insertion port according to an instruction of the CPU 401, for example, and outputs the information to the CPU 401. The ETC card includes an IC chip, for example. For example, the ETC card number, the vehicle information of the vehicle associated with the ETC card, and the like are recorded on the IC chip. The user identification information of the user to be the advertiser of the advertisement posting system 100 may be recorded on the IC chip of the ETC card. However, the user identification information of the advertiser of the advertisement posting system 100 is not limited to this but may be recorded on the external storage device 403, for example. The ETC card number is the peculiar number allotted to the ETC card and formed with the identification number of the company issuing the ETC card, the credit card company, or the like and the identification number of the user. The ETC card number is an example of the "payment information."

For example, the car model (standard-size car, large-size car, or the like), vehicle identification number, and the like are included in the vehicle information. The user identification information may be any of the information such as the user identification used in common with the ETC system, the name of the user, the name of the company of the user, and the identification information allotted uniquely in the advertisement posting system 100, for example. Further, the ETC card number may be used as the user identification information and, in such case, the ETC card number need not be transmitted separately as the user identification information. Note that the user to be the advertiser may be an individual or may be an organization such as a company.

Note that the hardware components of the center server 1, the roadside apparatus 2, and the onboard apparatus 4 illustrated in FIG. 2 are examples and not limited to those, and can be omitted, replaced, and added as appropriate depending on an embodiment. For example, the center server 1 may include a removable recording medium driving apparatus and execute the programs recorded on a removable recording medium. For example, the removable recording medium may be a recording medium such as an SD card, a mini SD card, a micro SD card, a USB (Universal Serial Bus) flash memory, a CD (Compact Disc), a DVD (Digital Versatile Disc), a Blu-ray (registered trademark) disc, or a flash memory card. Further, the center server 1 may include an input device and an output device, for example. The input device may be a keyboard, a mouse, or a touch panel, for example. The output device may be a display, for example.

A series of processing executed by the center server 1, the roadside apparatus 2, and the onboard apparatus 4 are not limited to being achieved by execution of software by the processor but may be achieved by hardware such as an FPGA (Field-Programmable Gate Array), for example.

Figure 3:
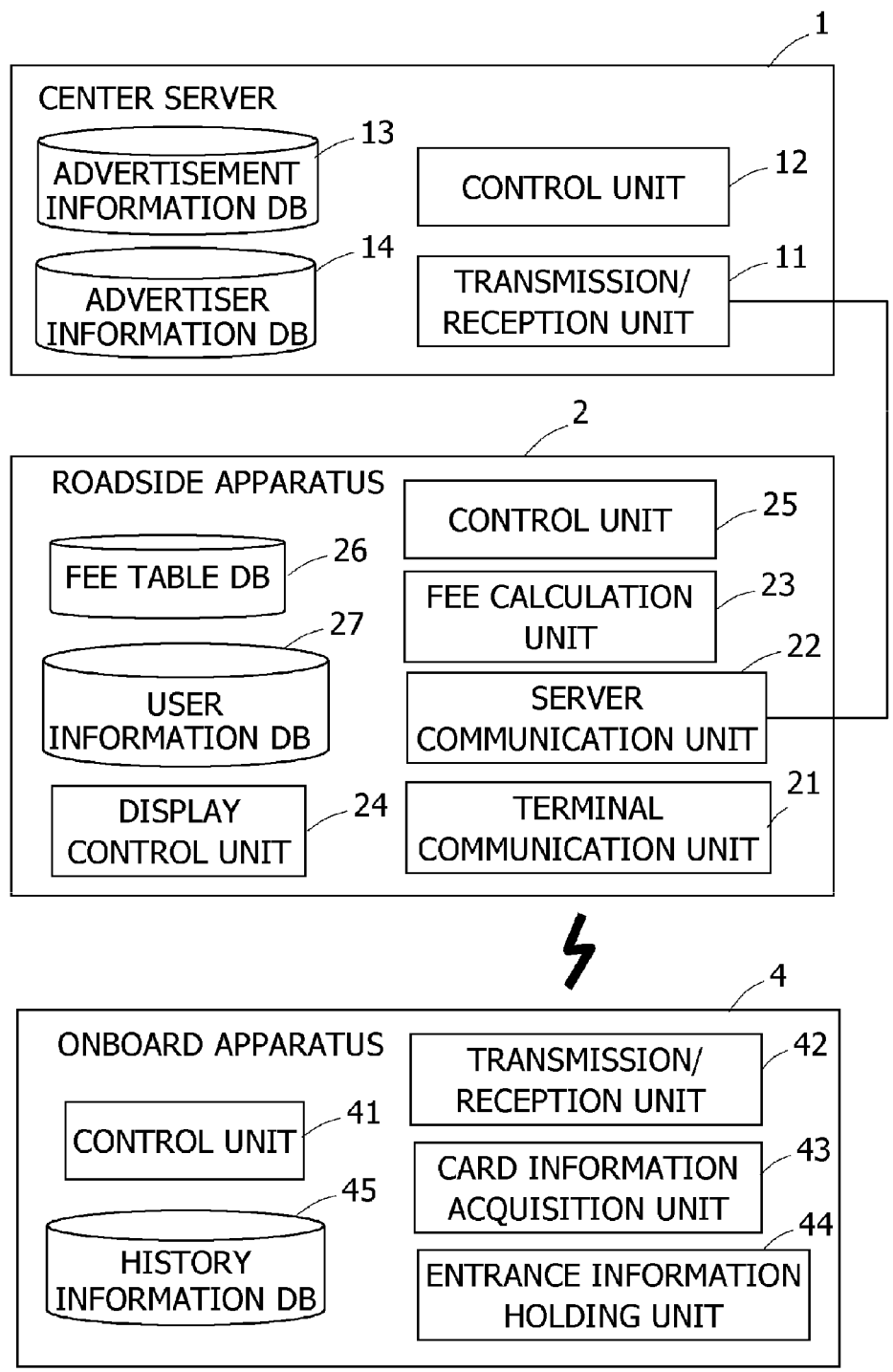
FIG. 3 is a diagram illustrating examples of functional components of the center server, the roadside apparatus, and the onboard apparatus in the advertisement posting system.

FIG. 3 is a diagram illustrating examples of functional components of the center server 1, the roadside apparatus 2, and the onboard apparatus 4 in the advertisement posting system 100. As the functional components, the onboard apparatus 4 includes a control unit 41, a transmission/reception unit 42, a card information acquisition unit 43, an entrance information holding unit 44, and a history information database (DB) 45. Those functional components are achieved by executing the control program for the onboard apparatus 4 of the advertisement posting system 100 stored in the external storage device 403 or the control program for the onboard apparatus of the ETC system by the CPU 401 of the onboard apparatus 4, for example.

The transmission/reception unit 42 is an interface for communicating with the roadside apparatus 2 via the communication unit 404. Upon receiving the signal transmitted from the roadside apparatus 2 via the communication unit 404, the transmission/reception unit 42 performs control to establish a session with the roadside apparatus 2. The transmission/reception unit 42 outputs the data received from the roadside apparatus 2 via the communication unit 404 to the control unit 41, for example. Further, the transmission/reception unit 42 transmits the data inputted from the control unit 41, for example, to the roadside apparatus 2 via the communication unit 404.

The card information acquisition unit 43 acquires the information recorded on the ETC card from the ETC card reader 405 according to an instruction from the control unit 41, for example, and outputs the information to the control unit 41. The entrance information holding unit 44 is created in a memory area of the memory 402 and holds the entrance information. Recording and deletion of the entrance information to/from the entrance information holding unit 44 is done by the control unit 41, for example.

The control unit 41 receives, from the transmission/reception unit 42, input of gate identification information included in the signal received from the roadside apparatus 2. For example, it is possible to determine whether the gate associated with the roadside apparatus 2 is the entrance gate or the exit gate, from the gate identification information. When detecting from the gate identification information that the gate associated with the roadside apparatus 2 as the source of the gate identification information is the entrance gate, the control unit 41 acquires the passing time of the entrance gate, and stores the entrance information including the gate identification information and the passing time of the entrance gate to the entrance information holding unit 44, for example.

When detecting from the gate identification information that the gate associated with the roadside apparatus 2 as the source of the gate identification information is the exit gate, the control unit 41 gives an instruction to the transmission/reception unit 42 to establish a session with the roadside apparatus 2. Further, the control unit 41 holds, as the exit information, the gate identification information of the exit gate and the reception time of the signal as the gate passing time to the entrance information holding unit 44. Then, the control unit 41 gives an instruction to the card information acquisition unit 43 to read out the information from the ETC card to acquire the ETC card number, the vehicle information, and the like via the card information acquisition unit 43. When the user identification information is recorded on the ETC card, the user identification information is also acquired from the ETC card. Then, the control unit 41 acquires the entrance information from the entrance information holding unit 44, outputs the entrance information, the ETC card number, the vehicle information, and the user identification information to the transmission/reception unit 42 to transmit such information to the roadside apparatus 2 via the transmission/reception unit 42.

Further, the control unit 41 receives, from the transmission/reception unit 42, input of the information of the toll of the expressway received from the roadside apparatus 2 and/or the information of the advertising fee related to displaying the advertisement information on the roadside display apparatus 3. Hereinafter, the information of the toll of the expressway and/or the information of the advertising fee related to displaying the advertisement information on the roadside display apparatus 3 will be simply referred to as fee information. The control unit 41 acquires the entrance information and the exit information from the entrance information holding unit 44, and stores these information pieces in the history information DB 45 along with the fee information. Further, the control unit 41 deletes and refresh the entrance information and the exit information stored in the entrance information holding unit 44.

Information of the use history of the expressway is stored in the history information DB 45. In the use history of the expressway, the entrance information, the exit information, and the fee information, for example, are stored in an associated manner.

Next, the roadside apparatus 2 includes a terminal communication unit 21, a server communication unit 22, a fee calculation unit 23, a display control unit 24, a control unit 25, a fee table DB 26, and a user information DB 27 as the functional components. Those functional components are achieved by executing the control program for the roadside apparatus 2 of the advertisement posting system 100 stored in the external storage device 203 by the CPU 201 of the roadside apparatus 2.

The terminal communication unit 21 controls communications with the onboard apparatus 4 performed via the second communication unit 205. For example, the terminal communication unit 21 gives an instruction to the second communication unit 205 to transmit the signal including the gate identification information of the gate associated with the roadside apparatus 2 at a predetermined period. Further, the terminal communication unit 21 receives a connection request or the like from the onboard apparatus 4 that has received the signal, and performs control to establish a session with the onboard apparatus 4. Upon receiving the entrance information, the ETC card number, the vehicle information, the user identification information, and the like from the onboard apparatus 4, the terminal communication unit 21 outputs those to the control unit 25. Further, when the fee information is inputted from the control unit 25, for example, the terminal communication unit 21 transmits the fee information to the onboard apparatus 4 via the second communication unit 205.

The server communication unit 22 controls communications with the center server 1 and other servers performed via the first communication unit 204. For example, upon receiving, from the control unit 25, input of the user identification information received from the onboard apparatus 4, the server communication unit 22 transmits the user identification information to the center server 1. For example, upon receiving, from the center server 1, the advertisement information corresponding to the user identification information and the information of the advertising fee received from the onboard apparatus 4. The server communication unit 22 also outputs those to the control unit 25.

The fee calculation unit 23 calculates the toll of the expressway according to an instruction of the control unit 25, for example. The toll of the expressway is calculated based on the fee table stored in the fee table DB 26 as well as the entrance information and the vehicle information received from the onboard apparatus 4, for example.

The display control unit 24 performs control related to display on the roadside display apparatus 3. For example, the display control unit 24 receives input of the advertisement information from the control unit 25, and displays the advertisement information on the roadside display apparatus 3.

The control unit 25 performs control related to the advertisement posting system 100 in the roadside apparatus 2. Specifically, the control is performed as follows. Upon receiving, from the terminal communication unit 21, input of the user identification information received from the onboard apparatus 4, the control unit 25 determines whether or not the user is the advertiser of the advertisement posting system 100 based on the user identification information. When the user is the advertiser, the control unit 25 outputs the user identification information to the server communication unit 22 to transmit the user identification information to the center server 1 via the server communication unit 22.

Further, upon receiving, from the terminal communication unit 21, the user identification information, the entrance information, and the vehicle information received from the onboard apparatus 4, the control unit 25 gives an instruction to the fee calculation unit 23 to acquire the information of the toll of the expressway. Upon receiving input of the information of the toll of the expressway from the fee calculation unit 23, the control unit 25 outputs the received information to the terminal communication unit 21 to transmit the information of the toll of the expressway to the onboard apparatus 4 via the terminal communication unit 21. Along with this, the control unit 25 outputs the information of the toll of the expressway to the server communication unit 22 to transmit the information to the settlement server via the server communication unit 22 to perform settlement processing of the toll of the expressway. The settlement server is a server of a credit card company specified from the EC card number of the ETC card registered for making a payment of the toll of the expressway, for example. The settlement server for settling a payment of the toll of the expressway is an example of the "first server."

Further, the control unit 25 receives, from the server communication unit 22, input of the advertisement information received from the center server 1 and outputs the advertisement information to the display control unit 24. Also, the control unit 25 receives, from the server communication unit 22, input of the information of the advertising fee received from the center server 1 and outputs the information of the advertising fee to the terminal communication unit 21 to transmit the information to the onboard apparatus 4 via the terminal communication unit 21. Receiving the information of the advertising fee from the center server 1 is an example of "acquiring the information of the advertising fee related to displaying the advertisement information on the display apparatus."

The fee table DB 26 and the user information DB 27 are created on a memory area of the external storage device 203 of the roadside apparatus 2, for example. The fee table DB 26 holds a fee table of the tolls of the expressway, for example.

The tolls of the expressway are determined according to the distance between the entrance gate and the exit gate the vehicle passes through, and the car model, for example. Therefore, the fee table of the tolls of the expressway held in the fee table DB 26 holds association in regards to the identification information of the entrance gates, the car models, and the tolls, for example. Note, however, that the fee table of the tolls of the expressway held in the fee table DB 26 is not limited to this.

For example, information regarding the advertisers of the advertisement posting system 100 is stored in the user information DB 27. There is the user identification information of the advertisers as the information regarding the advertisers stored in the user information DB 27, for example. Note, however, that the information regarding the advertisers stored in the user information DB 27 is not limited to the user identification information.

Next, the center server 1 includes a transmission/reception unit 11, a control unit 12, an advertisement information DB 13, and an advertiser information DB 14 as the functional components. Those functional components are achieved by executing the control program for the center server 1 of the advertisement posting system 100 stored in the external storage device 103 by the CPU 101 of the center server 1, for example.

The transmission/reception unit 11 controls communications with the roadside apparatus 2 and other servers performed via the communication unit 104. For example, upon receiving the user identification information from the roadside apparatus 2, the transmission/reception unit 11 outputs the user identification information to the control unit 12. Further, upon receiving, from the control unit 12, input of the advertisement information corresponding to the user identification information and the information of the advertising fee received from the roadside apparatus 2, the transmission/reception unit 11 transmits the information to the roadside apparatus 2. Also, at this time, the transmission/reception unit 11 transmits the information of the advertising fee to a predetermined server. The predetermined server is a server or the like of the credit card company registered for making a payment of the advertising fee, for example.

The control unit 12 receives, from the transmission/reception unit 11, the input of the user identification information received from the roadside apparatus 2. The control unit 12 determines whether or not the inputted user identification information is the user identification information of the advertiser of the advertisement posting system 100 based on the advertiser information DB 14 to be described later. When the inputted user identification information is the user identification information of the advertiser of the advertisement posting system 100, the control unit 12 acquires the advertisement information of the advertiser from the advertisement information DB 13 to be described later.

Further, the control unit 12 acquires the information of the advertising fee at the this time. The advertising fee related to displaying the advertisement information on the roadside display apparatus 3 may be determined based on at least one of the displaying time, the time zone to be displayed, the traffic amount, the number of times of display, and the like, for example. For example, the advertising fee may be set to be higher as the time to be displayed is longer. For example, the advertising fee may be set to be higher as the information is displayed in the time zone where the traffic is heavier. For example, the advertising fee may be set to be higher as the number of times of display is greater. Further, the advertising fee may be set for each predetermined unit such as per displaying time or for every one hour of the total displaying time. Note, however, that the methods for determining the advertising fee are not limited to those described above.

The control unit 12 outputs the advertisement information and the information of the advertising fee to the transmission/reception unit 11 to transmit the information to the roadside apparatus 2 via the transmission/reception unit 11. Further, the control unit 12 performs the settlement processing of the advertising fee every time the advertisement information is displayed or at a predetermined timing such as once a month, for example. In the settlement processing of the advertising fee, the control unit 12 transmits the information of the advertising fee to the settlement server that performs the settlement of advertising fee for each of the advertisers. The settlement server that settles a payment of the advertising fee is a server of the credit card company registered with the advertiser information DB 14 to be described later, for example.

When the timing of the settlement processing of the advertising fee is a predetermined period such as once a month, for example, the total amount of the advertising fee for one period is transmitted.

The advertisement information DB 13 and the advertiser information DB 14 are created in a memory area of the external storage device 103 of the center server 1, for example. The advertisement information of the advertisers of the advertisement posting system 100 is stored in the advertisement information DB 13. The advertisement information is a file of a still image, a video, or the like. The information may be provided with sound. For example, the advertiser identification information and the advertisement information are stored in the advertisement information DB 13 in an associated manner.

For example, the information regarding the users as the advertisers of the advertisement posting system 100 is stored in the advertiser information DB 14. For example, the user identification information, the advertiser identification information, payee information, the vehicle information, and the like are stored in the advertiser information DB 14 in an associated manner. The payee information is the credit card number or the like used for making a payment of the advertising fee, for example.

The functional components of the center server 1, the roadside apparatus 2, the onboard apparatus 4 illustrated in FIG. 3 are examples, and the functional components are not limited to those illustrated in FIG. 3.

<Flow of Processing>

Figure 4:
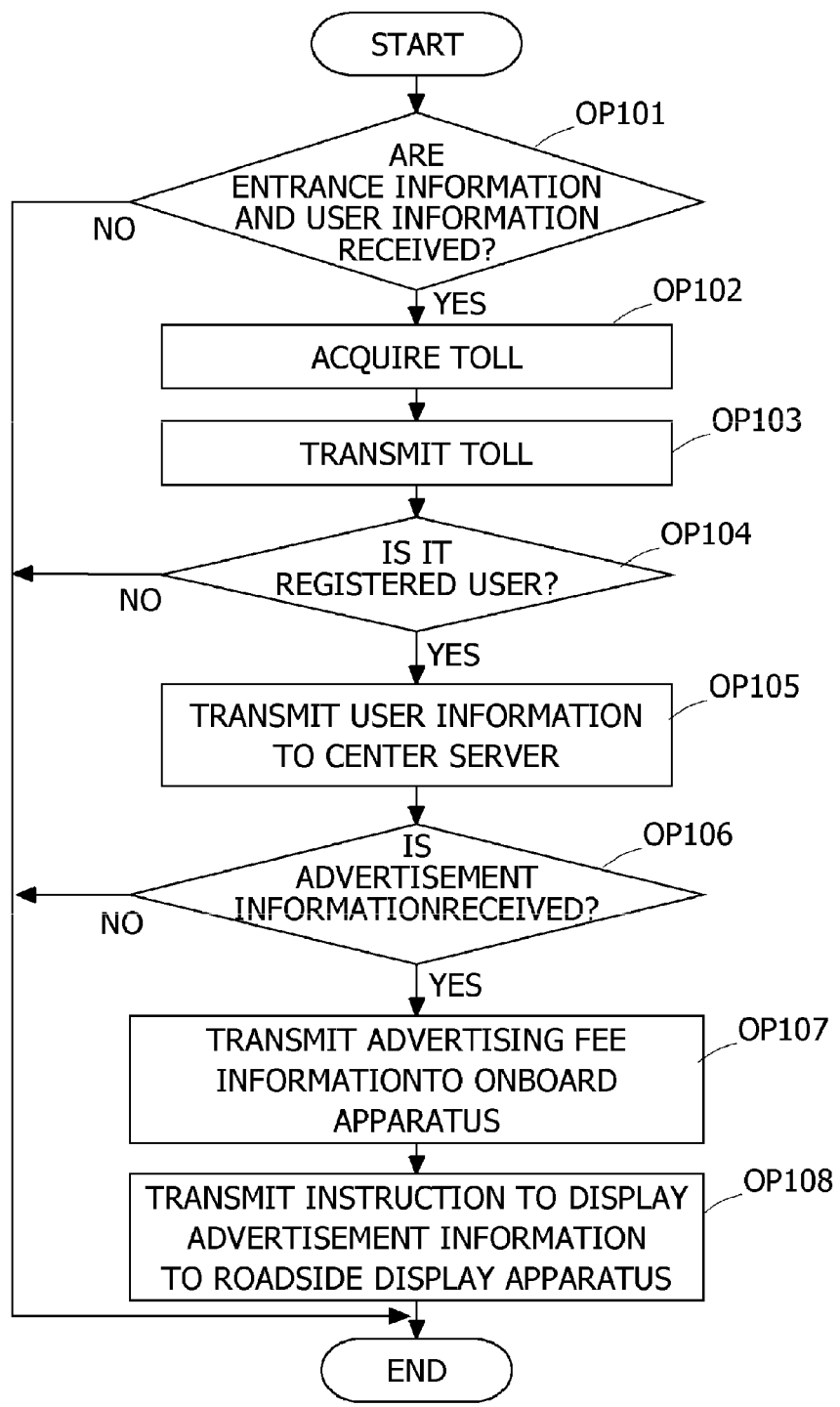
FIG. 4 is a flowchart of the processing of the roadside apparatus.

FIG. 4 is a flowchart of the processing of the roadside apparatus 2. The processing illustrated in FIG. 4 is repeatedly executed at a predetermined period, for example. An entity executing the processing illustrated in FIG. 4 is the CPU 201 of the roadside apparatus 2, and the functional component is described as the entity for convenience.

In OP101, the control unit 25 determines whether or not the entrance information, the ETC card number, the vehicle information, and the user identification information are received from the onboard apparatus 4. When the entrance information, the ETC card number, the vehicle information, and the user identification information are received (OP101: YES), the processing advances to OP102. When the entrance information, the ETC card number, the vehicle information, and the user identification information are not received (OP101: NO), the processing illustrated in FIG. 4 ends.

In OP102, the control unit 25 gives an instruction to the fee calculation unit 23 to calculate the toll of the expressway to acquire the information of the toll of the expressway from the fee calculation unit 23. In OP103, the control unit 25 transmits the information of the toll of the expressway to the onboard apparatus 4 via the terminal communication unit 21 and also to the settlement server of the toll of the expressway via the server communication unit 22.

In OP104, the control unit 25 determines whether or not the received user identification information is the user identification information of the advertiser based on the user information DB 27. When the received user identification information is the user identification information of the advertiser (OP104: YES), the processing advances to OP105. When the received user identification information is not the user identification information of the advertiser (OP104: NO), the processing illustrated in FIG. 4 ends. For example, when the received user identification information is registered with the user information DB 27, it is determined that the received user identification information is the user identification information of the advertiser.

In OP105, the control unit 25 outputs the user identification information to the server communication unit 22 to transmit the user identification information to the center server 1 via the server communication unit 22.

In OP106, the control unit 25 determines whether or not the advertisement information corresponding to the user identification information transmitted in OP105 is received from the center server 1. When the advertisement information is received from the center server 1 (OP106: YES), the processing advances to OP107. For example, when the advertisement information is not received from the center server 1 even after a predetermined time has passed from transmission of the user identification information in OP105 (OP106: NO), the processing illustrated in FIG. 4 ends. Note that the information of the advertising fee is also received from the center server 1 along with the advertisement information.

In OP107, the control unit 25 transmits the information of the advertising fee to the onboard apparatus 4 via the terminal communication unit 21. In OP108, the control unit 25 outputs the advertisement information received from the center server 1 to the display control unit 24, and outputs an instruction to display the advertisement information on the roadside display apparatus 3 via the display control unit 24. Thereafter, the advertisement information is displayed on the roadside display apparatus 3. Then, the processing illustrated in FIG. 4 ends.

Note that the processing of the roadside apparatus 2 illustrated in FIG. 4 is an example, and the processing is not limited to this. For example, transmission of the toll of the expressway (OP104) may be performed together with transmission of the information of the advertising fee (OP107). Further, the order of the processing for transmission of the information of the advertising fee and for display of the advertisement information on the roadside display apparatus 3 may be reversed.

Figure 5:
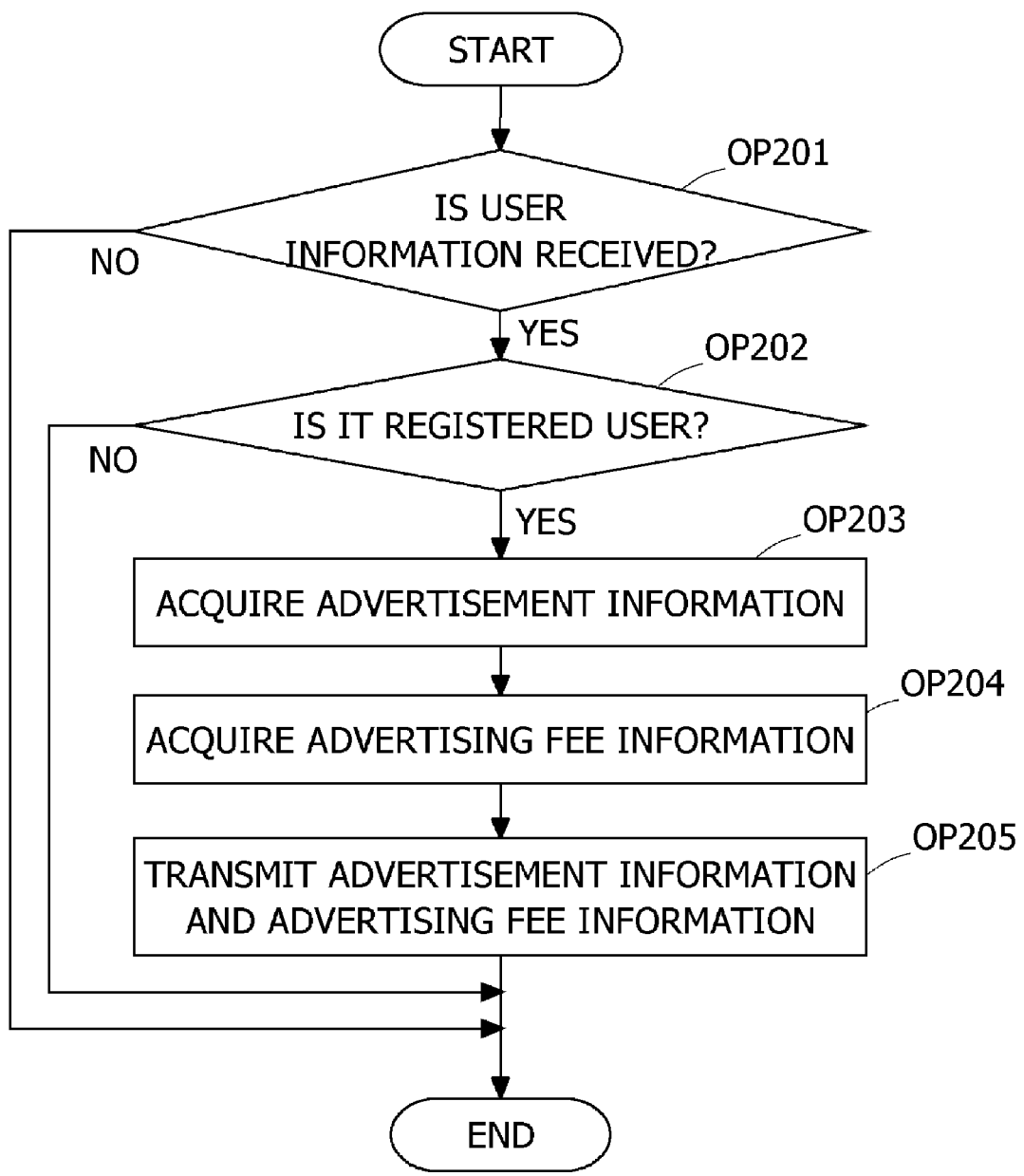
FIG. 5 is an example of a flowchart of the processing of the center server.

FIG. 5 is an example of a flowchart of the processing of the center server 1. The processing illustrated in FIG. 5 is repeatedly executed at a predetermined period, for example. The entity for executing the processing illustrated in FIG. 5 is the CPU 101 of the center server 1, and the functional component is described as the entity for convenience.

In OP201, the control unit 12 determines whether or not the user identification information is received from the roadside apparatus 2. When the user identification information is received (OP201: YES), the processing is advanced to OP202. When the user identification information is not received (OP201: NO), the processing illustrated in FIG. 5 ends.

In OP202, the control unit 12 determines whether or not the received user identification information is the user identification information of the advertiser based on the advertiser information DB 14. When the received user identification information is the user identification information of the advertiser (OP202: YES), the processing advances to OP203. When the received user identification information is not the user identification information of the advertiser (OP202: NO), the processing illustrated in FIG. 5 ends. When the received user identification information is registered in the advertiser information DB 14, for example, it is determined that the received user identification information is the user identification information of the advertiser.

In OP203, the control unit 12 acquires the advertiser identification information corresponding to the user identification information from the advertiser information DB 14 and acquires the advertisement information associated with the advertiser identification information from the advertisement information DB 13. In OP204, the control unit 12 acquires the information of the advertising fee.

In OP205, the control unit 12 outputs the advertisement information acquired in OP203 and the information of the advertising fee acquired in OP204 to the transmission/reception unit 11 to transmit the information pieces to the roadside apparatus 2 via the transmission/reception unit 11. Thereafter, the processing illustrated in FIG. 5 ends. Note that the processing of the center server 1 illustrated in FIG. 5 is an example, and the processing is not limited to that.

Figure 6:
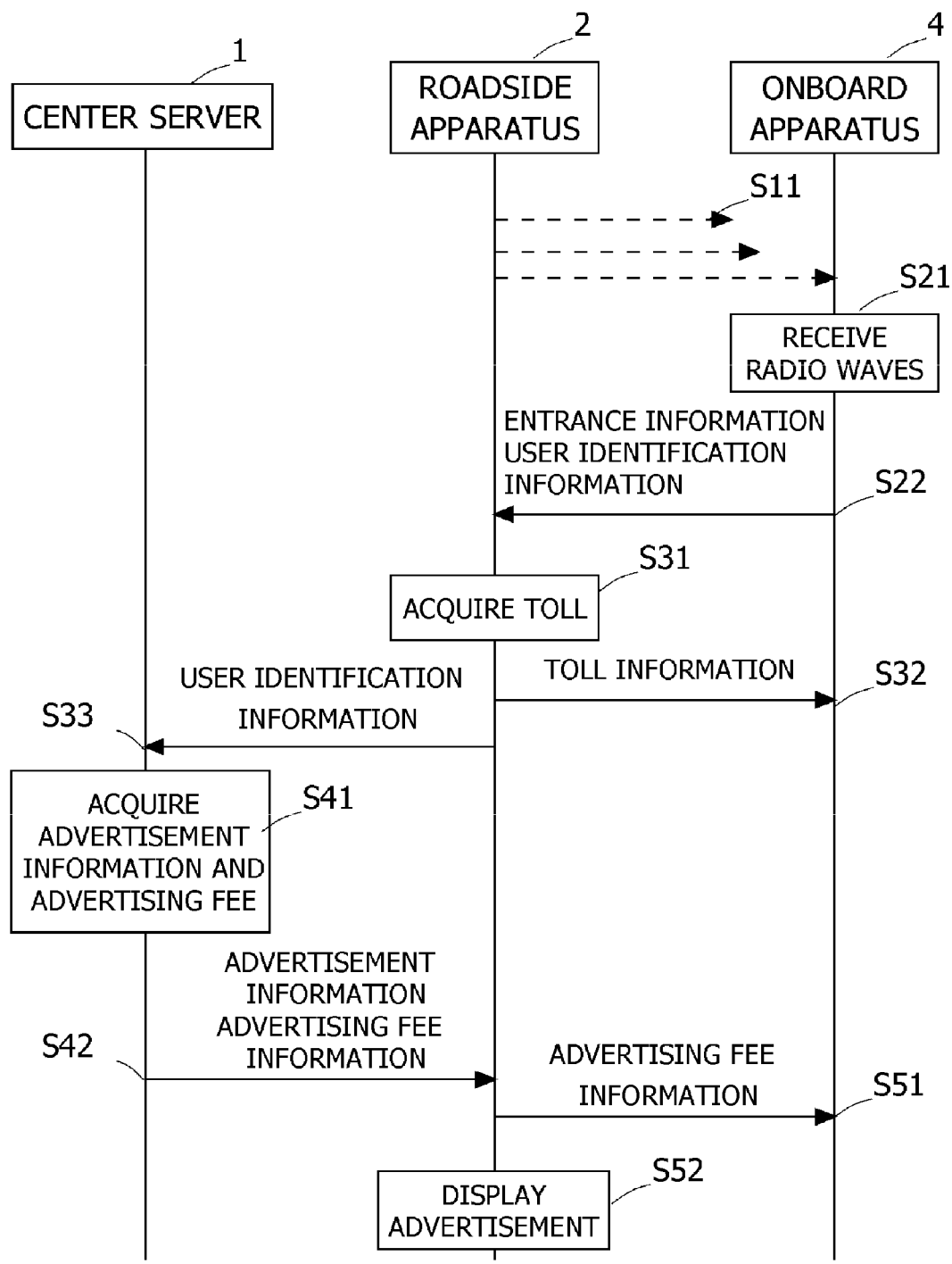
FIG. 6 is a chart illustrating an example of a sequence of the processing of the advertisement posting system.

FIG. 6 is a chart illustrating an example of a sequence of the processing of the advertisement posting system 100. In FIG. 6, the onboard apparatus 4 is assumed to be an onboard apparatus which is loaded on the vehicle owned by the advertiser and to which an ETC card recording the user identification information of the advertiser is inserted.

In S11, the roadside apparatus 2 sends out a signal including the identification information of the exit gate at a predetermined period. In S21, the onboard apparatus 4 approaches the exit gate in the vicinity of the roadside apparatus 2 and receives the signal sent out from the roadside apparatus 2. In S22, the onboard apparatus 4 transmits the entrance information, the vehicle information, the ETC card number, and the user identification information to the roadside apparatus 2. In FIG. 6, however, the entrance information and the user identification information alone are extracted and illustrated.

In S31, the roadside apparatus 2 receives the information from the onboard apparatus 4 (OP101: YES in FIG. 4), and acquires the information of the toll of the expressway based on the entrance information and the vehicle information (OP102 in FIG. 4). In S32, the roadside apparatus 2 transmits the information of the toll of the expressway to the onboard apparatus 4 (OP103 in FIG. 4). Along with that, the roadside apparatus 2 transmits the information of the toll to the settlement server.

In S33, the roadside apparatus 2 determines that the user identification information received from the onboard apparatus 4 is the information of the advertiser (OP104: YES in FIG. 4), and transmits the user identification information to the center server 1 (OP105 in FIG. 4).

In S41, the center server 1 receives the user identification information from the roadside apparatus 2 (OP201: YES in FIG. 5), and acquires the advertisement information of the advertiser corresponding to the user identification information and the information of the advertising fee (OP203, OP204 in FIG. 5). In S42, the center server 1 transmits the advertisement information and the information of the advertising fee to the roadside apparatus 2 (OP205 in FIG. 5).

In S51, the roadside apparatus 2 receives the advertisement information and the information of the advertising fee from the center server 1 (OP106: YES in FIG. 4), and transmits the information of the advertising fee to the onboard apparatus 4 (OP107 in FIG. 4). In S52, the roadside apparatus 2 outputs the advertisement information received from the center server 1 to the roadside display apparatus 3 to have the advertisement information displayed on the roadside display apparatus 3 (OP108 in FIG. 4).

Note that display of the advertisement information on the roadside display apparatus 3 may be ended when a predetermined time has passed after the display on the roadside display apparatus 3 is started or when a vehicle of another advertiser passes through the exit gate, for example. Further, in a case where display of advertisement information is to be ended after a predetermined time passes from the start of display on the roadside display apparatus 3, for example, when a vehicle of another advertiser passes through the exit gate during display of the advertisement information, the advertisement information of the other advertiser mentioned above may be displayed after the display of the currently displayed advertisement information is ended.

(Operations and Effects of First Embodiment)

With the first embodiment, when the vehicle of the advertiser passes through the exit gate of the expressway, the advertisement information of the advertiser is displayed on the roadside display apparatus 3 placed in the vicinity of the exit gate. This makes it possible to post the advertisement for the following vehicles of the vehicle of the advertiser, so that the advertising effect can be improved. Further, with the first embodiment, the advertising fee can be collected together with the toll of the expressway, so that it is possible to lighten the trouble, for the advertiser, related to making a payment of the advertising fee.

Further, with the first embodiment, it is possible to utilize the existing ETC system and the onboard ETC apparatus, so that the cost for employing the advertisement posting system 100 can be suppressed in such case. Also, the existing system (the roadside display apparatus 3, the onboard apparatus 4, and the like) and the like can be effectively utilized. Furthermore, when predetermined identification information (for example, the ETC card number or the like) used in the existing ETC system is used for the user identification information, the onboard ETC apparatus may simply perform actions that are normally done in the conventional ETC system, so that it is easy to introduce the advertisement posting system 100.

Further, when the advertisement posting system 100 utilizes the existing ETC system, for example, the roadside apparatus 2 may collect the information regarding the users and the vehicle information of the vehicles having passed through the exit gate while the advertisement information is being displayed on the roadside display apparatus 3, and the center server 1 may collect such information from each of the roadside apparatuses 2. In such case, it is possible to collect the information regarding the vehicles having passed through the exit gate and/or the users while an advertisement information piece is being displayed, so that the advertising effect can be researched more easily.

Other Embodiments

The embodiment described above is an example, and the present disclosure may be changed and carried out as appropriate without departing from the gist of the present disclosure.

While both the roadside apparatus 2 and the center server 1 determine whether or not the user identification information received from the onboard apparatus 4 is the information of the advertiser in the first embodiment, such determination may also be done by either one of the roadside apparatus 2 or the center server 1.

While the roadside display apparatus 3 and the roadside apparatus 2 are connected and the roadside apparatus 2 performs control of display on the roadside display apparatus 3 in the first embodiment, the configuration is not limited to that. For example, the roadside display apparatus 3 may be connected to the center server 1 via a network, and the center server 1 may perform control of display on the roadside display apparatus 3.

For example, upon receiving the signal transmitted from the roadside apparatus 2, the onboard apparatus 4 may transmit the advertisement information desired to be displayed on the roadside display apparatus 3 to the roadside apparatus 2 along with the entrance information, the vehicle information, the ETC card number, and the user identification information. In such case, when it is determined that the user identification information received from the onboard apparatus 4 is the information of the advertiser, the roadside apparatus 2 may have the advertisement information received from the onboard apparatus 4 displayed on the roadside display apparatus 3.

Further, the roadside apparatus 2 may transmit the vehicle information and the entrance information received from the onboard apparatus 4 as well as the identification information and the like of the exit gate with which the roadside apparatus 2 is associated, to the center server 1 along with the user identification information received from the onboard apparatus 4, and the center server 1 may store therein these information pieces as the history information of the display of the advertisement. This makes it possible to provide the history information of the display of the advertisement to the advertiser and the like, for example.

Further, the center server 1 may hold a plurality of advertisement information pieces for a single advertiser in the advertisement information DB 13. In such case, for example, when advertisement information of company A is being displayed on the roadside display apparatus 3 and a vehicle of company A passes through the exit gate anew, the center server 1 may acquire advertisement information of company A different from the advertisement information being displayed, and transmit the advertisement information to the roadside apparatus 2 to be displayed on the roadside display apparatus 3. Thereby, in a case of the advertiser exhibiting a high use frequency of a predetermined tollgate of an expressway, for example, the advertisement information to be displayed on the roadside display apparatus 3 can be changed every time the vehicle of the advertiser passes through the tollgate, thereby making it possible to post various kinds of advertisement information to other vehicles.

Further, while the first embodiment is described by referring to a case of displaying the advertisement on the roadside display apparatus 3 placed in the vicinity of the exit gate of the expressway, the technique described in the first embodiment can also be applied to displaying the advertisement on a roadside display apparatus placed in the vicinity of an entrance gate of the expressway, for example. It is possible to achieve such application by transmitting the user identification information to the roadside apparatus placed in the vicinity of the entrance gate from the onboard apparatus 4 when a vehicle passes through the entrance gate, for example, to have the roadside apparatus execute the processing with the center server 1 like the roadside apparatus 2 of the first embodiment.

Further, while the first embodiment is described by referring to a case where the vehicle passes through the exit gate placed at the tollgate of the expressway, the technique described in the first embodiment is not limited to being applied to the tollgates of expressways. For example, the technique can be applied to exit gates where a display apparatus is placed at pay stands of pay parking lots, for example. The pay parking lot is an example of the "pay facility". The exit gate of the pay parking lot is an example of the "exit." The parking fee of the pay parking lot is an example of the "use fee" of the "pay facility."

Further, even though there is no gate being provided, the technique described in the first embodiment can also be applied to a predetermined area where a roadside apparatus capable of recording entering and leaving of vehicles and capable of communicating with the vehicles is placed and a display apparatus is placed in the vicinity of the roadside display apparatus. Further, the technique described in the first embodiment can also be applied to entrances of facilities for vehicles where the fee is to be paid at the time of admission, for example.

The processes and means described in the present disclosure may be freely combined to the extent that no technical conflict exists.

A process which is described to be performed by one device may be performed divided among a plurality of devices. Processes described to be performed by different devices may be performed by one device. Each function is to be implemented by which hardware component (server component) in a computer system may be flexibly changed.

The present disclosure may also be implemented by supplying a computer program for implementing a function described in the embodiment above to a computer, and by reading and executing the program by at least one processor of the computer. Such a computer program may be provided to a computer by a non-transitory computer-readable storage medium which is connectable to a system bus of a computer, or may be provided to a computer through a network. The non-transitory computer-readable storage medium may be any type of disk such as a magnetic disk (floppy (registered trademark) disk, a hard disk drive (HDD), etc.), an optical disk (CD-ROM, DVD disk, Blu-ray disk, etc.), a read only memory (ROM), a random access memory (RAM), an EPROM, an EEPROM, a magnetic card, a flash memory, an optical card, and any type of medium which is suitable for storing electronic instructions.

What is claimed is:

1. An information processing apparatus comprising a processor configured to:
   acquire user information regarding a user who owns a vehicle passing through an entrance or an exit of a toll road or a pay facility;
   acquire, when the user information is user information regarding an advertiser, advertisement information corresponding to the advertiser; and
   give an instruction to display the advertisement information on a display apparatus placed at the entrance or the exit,
   wherein
   the information processing apparatus is a roadside apparatus placed at the entrance or the exit and further comprises a radio communicator configured to perform predetermined radio communications with an onboard apparatus loaded on the vehicle, and the processor is configured to:
receive entrance information as information regarding admission to the toll road or the pay facility and payment information regarding a payment of a fee along with the user information from the onboard apparatus via the radio communicator;
acquire information of a use fee of the toll road or the pay facility based on the entrance information;
transmit the information of the use fee of the toll road or the pay facility to a first server that settles a payment based on the payment information;
acquire information of an advertising fee related to displaying the advertisement information on the display apparatus, the information of the advertising fee being acquired based on the user information and settled by a second server; and
transmit the information of the use fee of the toll road or the pay facility and the information of the advertising fee of the advertisement information to the onboard apparatus.

2. The information processing apparatus according to claim 1, wherein
when the vehicle of the advertiser passes through the entrance or the exit, the advertisement information is displayed on the display apparatus placed at the entrance or the exit.

3. An information processing system comprising:
a roadside apparatus placed at an entrance or an exit of a toll road or a pay facility;
a display apparatus placed at the entrance or the exit; and
a center server capable of communicating with the roadside apparatus;
wherein:
the roadside apparatus includes:
a radio communicator configured to perform predetermined radio communications with an onboard apparatus loaded on a vehicle passing through the entrance or the exit;
a communicator configured to communicate with the center server; and
a processor configured to transmit user information regarding a user who owns the vehicle, received from the onboard apparatus via the radio communicator to the center server via the communicator;
the center server includes a processor configured to:
receive the user information;
acquire, when the user information is user information regarding an advertiser, advertisement information corresponding to the advertiser; and
transmit an instruction to display the advertisement information on the display apparatus; and
the processor of the roadside apparatus is configured to:
receive entrance information as information regarding admission to the toll road or the pay facility and payment information regarding a payment of a fee along with the user information from the onboard apparatus via the radio communicator;
acquire information of a use fee of the toll road or the pay facility based on the entrance information;
transmit the information of the use fee of the toll road or the pay facility to a first server that settles a payment based on the payment information;
acquire information of an advertising fee related to displaying the advertisement information on the display apparatus, the information of the advertising fee being acquired based on the user information and settled by a second server; and
transmit the information of the use fee of the toll road or the pay facility and the information of the advertising fee of the advertisement information to the onboard apparatus.

4. An information processing method comprising:
acquiring, by a roadside apparatus placed at an entrance or an exit of a toll road or a pay facility, through a radio communicator, user information regarding a user who owns a vehicle passing through the entrance or the exit from an onboard apparatus loaded on the vehicle;
transmitting, by the roadside apparatus, the user information to a center server;
receiving, by the center server, the user information;
acquiring, by the center server, when the user information is user information regarding an advertiser, advertisement information corresponding to the advertiser;
transmitting, by the center server, an instruction to display the advertisement information on a display apparatus placed at the entrance or the exit;
receiving, by the roadside apparatus, entrance information as information regarding admission to the toll road or the pay facility and payment information regarding a payment of a fee along with the user information from the onboard apparatus via the radio communicator;
acquiring, by the roadside apparatus, information of a use fee of the toll road or the pay facility based on the entrance information;
transmitting, by the roadside apparatus, the information of the use fee of the toll road or the pay facility to a first server that settles a payment based on the payment information;
acquiring, by the roadside apparatus, information of an advertising fee related to displaying the advertisement information on the display apparatus, the information of the advertising fee being acquired based on the user information and settled by a second server; and
transmitting, by the roadside apparatus, the information of the use fee of the toll road or the pay facility and the information of the advertising fee of the advertisement information to the onboard apparatus.

* * * * *